United States Patent
Fatehpuria et al.

(10) Patent No.: US 9,420,022 B2
(45) Date of Patent: Aug. 16, 2016

(54) MEDIA REQUESTS TO COUNTER LATENCY AND MINIMIZE NETWORK BURSTS

(75) Inventors: Pradip K Fatehpuria, San Jose, CA (US); Zhefeng (Jeff) Du, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1497 days.

(21) Appl. No.: 12/972,195

(22) Filed: Dec. 17, 2010

(65) Prior Publication Data

US 2012/0158988 A1   Jun. 21, 2012

(51) Int. Cl.

| G06F 15/16 | (2006.01) |
|---|---|
| H04L 29/06 | (2006.01) |
| H04L 12/835 | (2013.01) |
| H04N 21/44 | (2011.01) |
| H04N 21/658 | (2011.01) |
| H04N 21/643 | (2011.01) |
| H04N 21/845 | (2011.01) |

(52) U.S. Cl.
CPC ............ H04L 65/4084 (2013.01); H04L 47/30 (2013.01); H04N 21/44004 (2013.01); H04N 21/6581 (2013.01); H04L 65/80 (2013.01); H04N 21/64322 (2013.01); H04N 21/8456 (2013.01)

(58) Field of Classification Search
CPC ..... H04L 47/00; H04L 47/196; H04L 47/528; H04L 65/4084; H04L 47/30; H04N 21/44004
USPC ....................................................... 709/234
See application file for complete search history.

(56) References Cited

U.S. PATENT DOCUMENTS

| 6,791,556 B1 * | 9/2004 | Laird ............................ 345/543 |
| 7,162,723 B2 | 1/2007 | Guthrie et al. |

(Continued)

FOREIGN PATENT DOCUMENTS

WO    WO2010045109 A1    4/2010

OTHER PUBLICATIONS

Abu-Ghazaleh, et al., "Optimizing Performance of Web Services with Chunk-Overlaying and Pipelined-Send", retrieved on Sep. 28, 2010 at <<http://citeseerx.ist.psu.edu/viewdoc/download?doi=10.1.1.84.3172&rep=rep1&type=pdf>>, Proceedings of International Conference in Internet Computing (ICIC), Jun. 2004, pp. 482-485.

(Continued)

*Primary Examiner* — David Lazaro
*Assistant Examiner* — Xiang Yu
(74) *Attorney, Agent, or Firm* — Aaron Chatterjee; Judy Yee; Micky Minhas

(57) ABSTRACT

A client media application sends a first request for a first chunk of a particular media stream. In response to the request, the client media application begins receiving data packets associated with the requested first chunk of the particular media stream. The data packets are received through a socket having a buffer. Rather than waiting until all of the data packets associated with the first chunk of the particular media stream have been read from the buffer by the client media application before sending a request for a second chunk of the particular media stream, the client media application monitors the amount of data that has been received compared to an expected amount of data, and sends the second request when it determines that the amount of data remaining to be received is less than the size of the buffer.

19 Claims, 4 Drawing Sheets

(56) References Cited

U.S. PATENT DOCUMENTS

| | | |
|---|---|---|
| 7,747,694 B2 | 6/2010 | McAllister et al. |
| 2006/0253546 A1 | 11/2006 | Chang et al. |
| 2008/0208789 A1 | 8/2008 | Almog |
| 2008/0256254 A1 | 10/2008 | Kim et al. |
| 2009/0077247 A1 | 3/2009 | Bouazizi et al. |
| 2011/0122939 A1* | 5/2011 | Ganesan et al. ......... 375/240.01 |
| 2011/0246659 A1* | 10/2011 | Bouazizi ...................... 709/231 |
| 2013/0304875 A1* | 11/2013 | Kaspar et al. ................ 709/219 |

OTHER PUBLICATIONS

Evensen, et al., "Quality-Adaptive Scheduling for Live Streaming over Multiple Access Networks", retrieved on Sep. 28, 2010 at <<http://simula.no/research/telco/publications/Simula.telco.2/simula_pdf_file>>, ACM, Proceedings of International Workshop on Network and Operating Systems Support for Digital Audio and Video (NOSSDAV), Amsterdam, The Netherlands, Jun. 2010, pp. 21-26.

\* cited by examiner

MEDIA REQUESTS TO COUNTER LATENCY AND MINIMIZE NETWORK BURSTS

BACKGROUND

With adaptive streaming technology, audio-video streams are divided into small files that are transmitted, in order, over a unicast connection (e.g., an HTTP connection) from a server to a client device. A typical client media application instantiates a socket and sets a receive buffer size (e.g., a TCP socket and a TCP receive buffer size). The client media application then submits a request (e.g., an HTTP GET request) for a first portion of a particular audio-video stream. In response to the request, the server sends a first portion of the requested audio-video stream, which is received by the client device through the socket, into the receive buffer. The data in the receive buffer may then be processed by a networking stack, from which the client media application receives the audio-video stream. Upon reading all of the received data from the networking stack, the client media application issues a second request (e.g., an HTTP GET request) for a second portion of the particular audio-video stream. This process continues until the full audio-video stream has been requested and received.

In systems with sufficient resources for large receive buffers and/or multiple sockets, this process works well. However, for client devices with limited resources, the network conditions and the distance between the client device and the server may result in considerable latency between two sequential requests. Such latency may severely impact an amount of buffered data that is available to the client media application, limiting the client media application's ability to provide smooth, quality playback of the audio-video stream. The client media application's ability to provide smooth, quality playback of the audio-video stream may be further impacted when the client device is configured for bit rate control, limiting the amount of bandwidth that the client media application is allowed to access. Waiting until all of the received data has been read from the network stack before issuing a subsequent request also results in significant network bursts, which are typically undesirable.

SUMMARY

This document describes media requests to counter latency and minimize network bursts. Requests for sequential portions of a media stream are sent such that a second request is sent before a client media application has received all of the data associated with a first request. In one aspect, the client media application monitors an amount of data that has been received, and sends the second request when it determines that the data remaining to be received from the first request is less than the size of a buffer where the data is received.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

To reduce latency and minimize network bursts, a client media application issues a subsequent media request (e.g., an HTTP GET request) prior to reading all of the existing data from the receive buffer. Rather than waiting to issue a subsequent HTTP GET request until all of the data received in response to the previous HTTP GET request is read from the networking stack, the client media application keeps track of the amount of data it has received in response to the previous HTTP GET request, and issues a next HTTP GET request when it determines that the amount of data remaining to be read from the networking stack for the previous HTTP GET request is less than the size of the TCP receive buffer.

Example Environment

Figure 1:
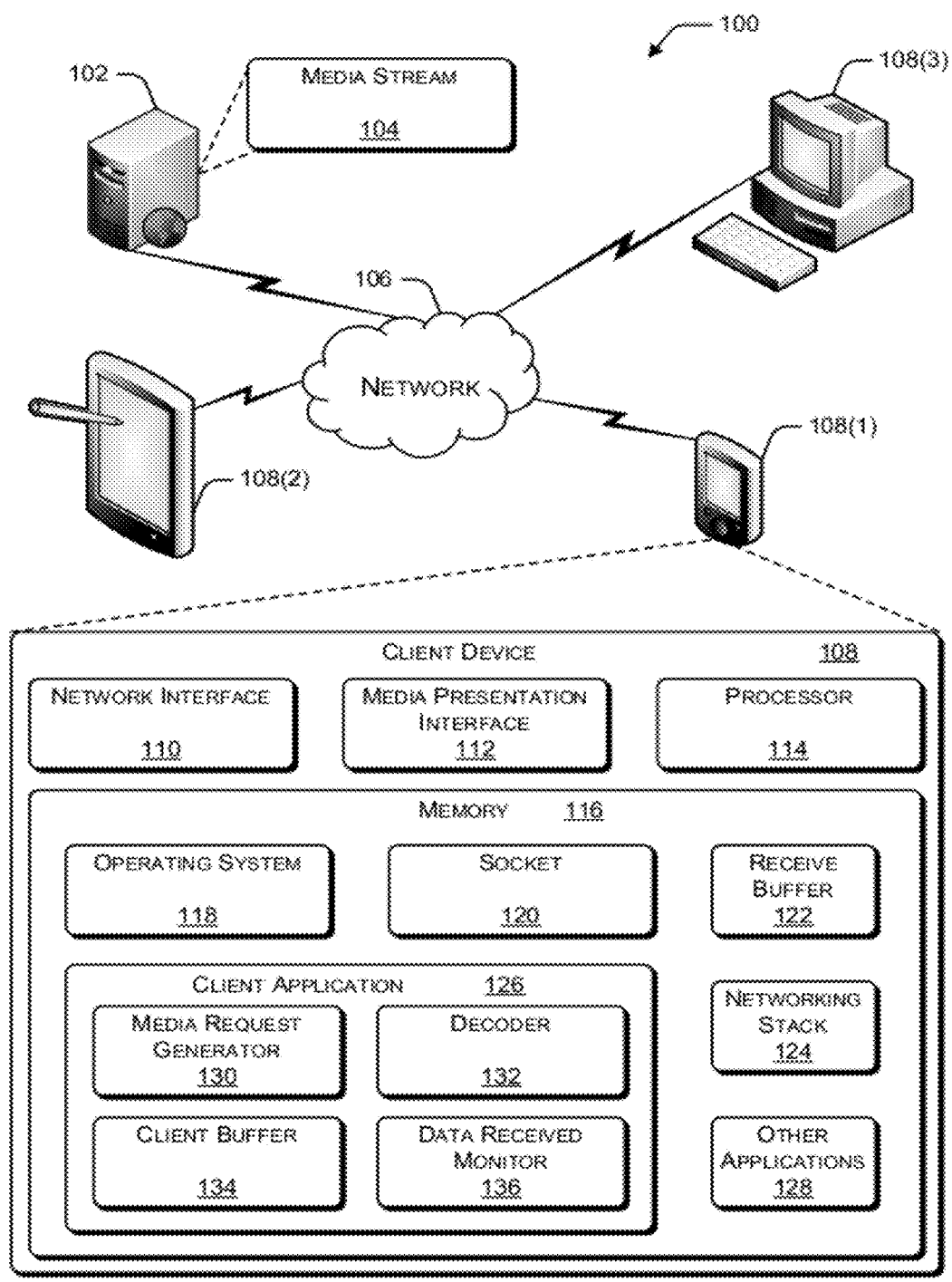
FIG. 1 is a pictorial diagram of an example environment in which media requests to counter latency may be implemented.

FIG. 1 illustrates an example environment 100 in which a client can issue media requests to counter latency and to minimize network bursts. Example environment 100 includes a server 102 that serves a media stream 104 over a network 106. Media stream 104 is representative of any type of media content that may be streamed over a network to a client device, including, but not limited to, audio and/or video streams. Network 106 is representative of, for example, the Internet.

Various types of network capable client devices 108 are configured to request and receive the media stream 104 over the network 106. Client devices 108 may include, but are not limited to, for example, a mobile phone 108(1), a tablet computing system 108(2), and a desktop computer system 108(3), each configured to request and receive the media stream 104. While client devices with limited resources may benefit more from the techniques described herein, client devices with less limited resources, such as desktop computer system 108(3) may also be configured to implement the techniques described herein.

FIG. 1 also illustrates components of an example client device 108, including a network interface 110, a media presentation interface 112, a processor 114, and a memory 116. Network interface 110 enables client device 108 to communicate with other devices, such as server 102, over network 106. Media presentation interface 112 enables data output for presentation to a user through, for example, a display device and/or speakers.

An operating system 118, any number of sockets 120 and receive buffers 122, a networking stack 124, a client media application 126, and any number of other applications 128 are stored in memory 116, at least in part as computer-readable instructions, and are executed, at least in part, on processor 114.

Socket 120 represents, for example, a TCP socket that may be instantiated by client media application 126 to receive media stream 104 from server 102 over network 106. Receive buffer 122 may also be initialized by client media application 126 to buffer the media stream content as it is received through the socket 120. In an example implementation, the number of sockets and the size of the receive buffer is limited such that, for example, client media application 126 instantiates only a single TCP socket with a receive buffer having a size of 128 KB. Networking stack 124 processes data from the receive buffer 122, making the data available to the requesting client media application 126.

Example client media application 126 represents any type of client application configured to present media content, including, but not limited to, a media player application. Example client media application 126 includes media request generator 130, decoder 132, client buffer 134, and data received monitor 136. Although not shown, client media application 126 may also include other components, including, but not limited to, a user interface.

Media request generator 130 is configured to create and send requests for media content. For example, media request generator 130 may generate a series of HTTP GET requests, one for each chunk of a particular media stream that is being requested.

Decoder 132 decodes received encoded media content, resulting in content that can be presented for consumption by a user.

Client buffer 134 stores received media content that has been decoded while previously received media content is being presented.

Data received monitor 136 monitors the amount of data received for a particular chunk of a requested media stream. By monitoring the amount of data that has been received, and comparing that with the known size of the chunk, media request generator 130 can create and send a request for a next chunk of the media stream prior to receiving all of the data associated with the first chunk of the media stream.

Although illustrated in FIG. 1 as being stored in memory 116 of client device 108, client media application 126, or portions thereof, may be implemented using any form of computer-readable media that is accessible by client device 108. Furthermore, in alternate implementations, any number of components or portions of components of client device 108 may be implemented as part of an integrated circuit that is part of, or accessible to, client device 108.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Data Flow

Figure 2:
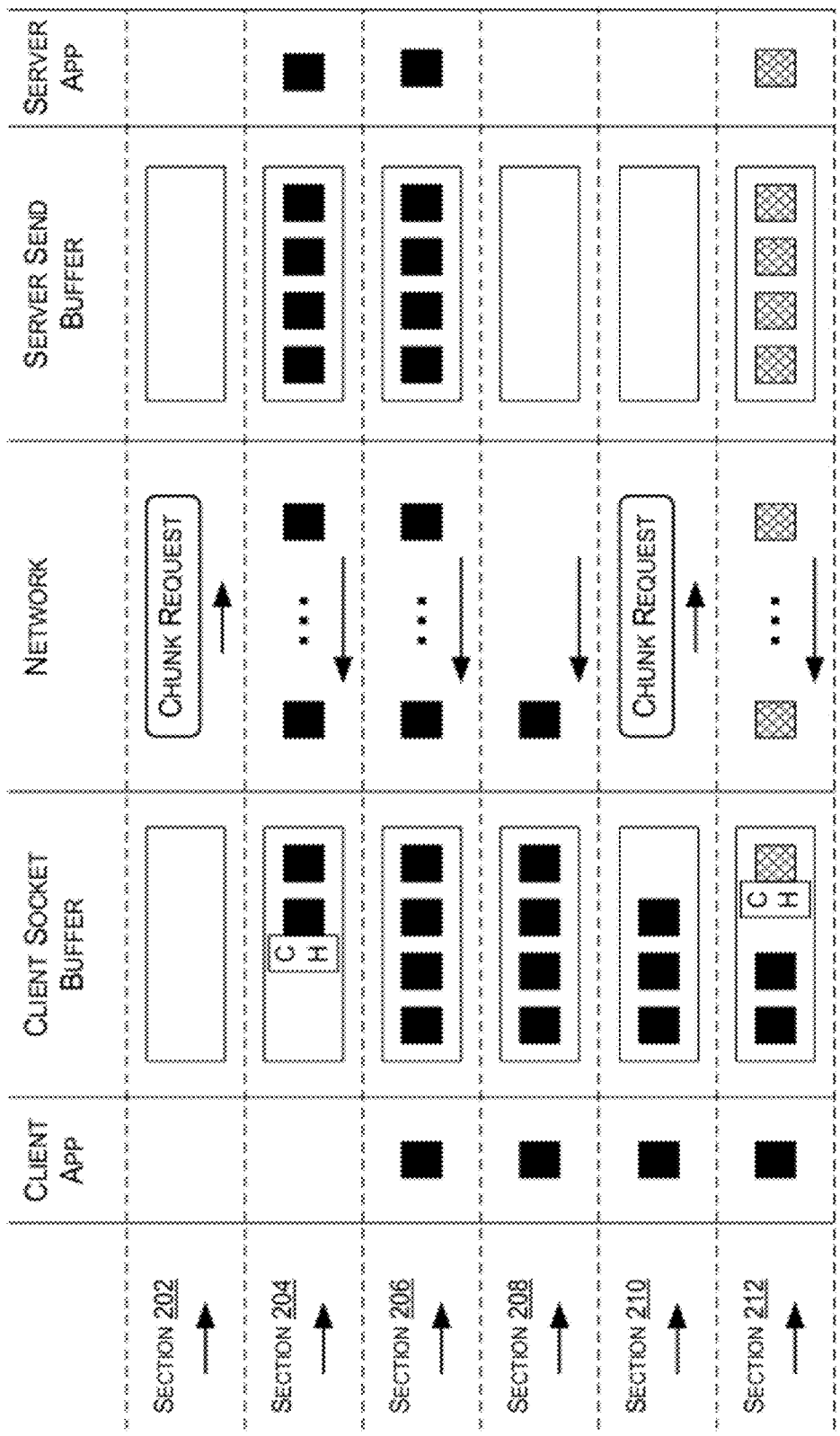
FIG. 2 is a data flow diagram that illustrates example data transmissions between a client and server.

FIG. 2 illustrates example data transmissions between client device 108 and server 102. Section 202 illustrates the sending of a media stream chunk request from the client media application to the server. For example, client media application 126 sends an HTTP GET request for media stream 104.

Section 204 illustrates transmission of a first chunk of media stream 104 from the server to the client device. In FIG. 2, the small solid blocks each represent a portion of a first chunk of the media stream. For example, each solid block may represent a single packet of data, with several packets making up a single chunk. As illustrated in section 204, a server application (e.g., an encoder) feeds the packets to a server send buffer. From the server send buffer, the packets are transmitted over the network 106, received at the client device 108, and added to the receive buffer 122. Section 204 shows the receive buffer 122 starting to fill up. The first portion of the chunk that is sent includes a chunk header (labeled CH in FIG. 2) that identifies a size of the chunk. Based on this information, the client media application can track the amount of received data and determine how much data is remaining to be received for the requested chunk.

Section 206 shows that as the receive buffer fills, the client media application then reads the packets from the receive buffer. In an example implementation, a networking stack processes the packets from the receive buffer, and the client media application reads the data from the networking stack. However, for simplicity of discussion, the networking stack is not shown in FIG. 2.

Section 208 shows data flow as the server reaches the end of the first chunk of the media stream. As shown, the server buffer empties as the last packet of data from the first chunk is transmitted over the network.

At section 210, the client media application determines that the data remaining for the client media application to receive is less than the size of the receive buffer. This is indicated in section 210 of FIG. 2 by the empty space in the receive buffer. Based on this determination, the client media application, while continuing to read packets associated with the first chunk, sends another request for a second chunk of the media stream.

Section 212 illustrates transmission of a second chunk of media stream 104 from the server to the client device. In FIG. 2, data packets associated with the second chunk of media stream 104 are indicated as hashed boxes.

The data flow illustrated in FIG. 2 is repeated until the client media application has received the complete media stream 104.

Example Operation

Figure 3:
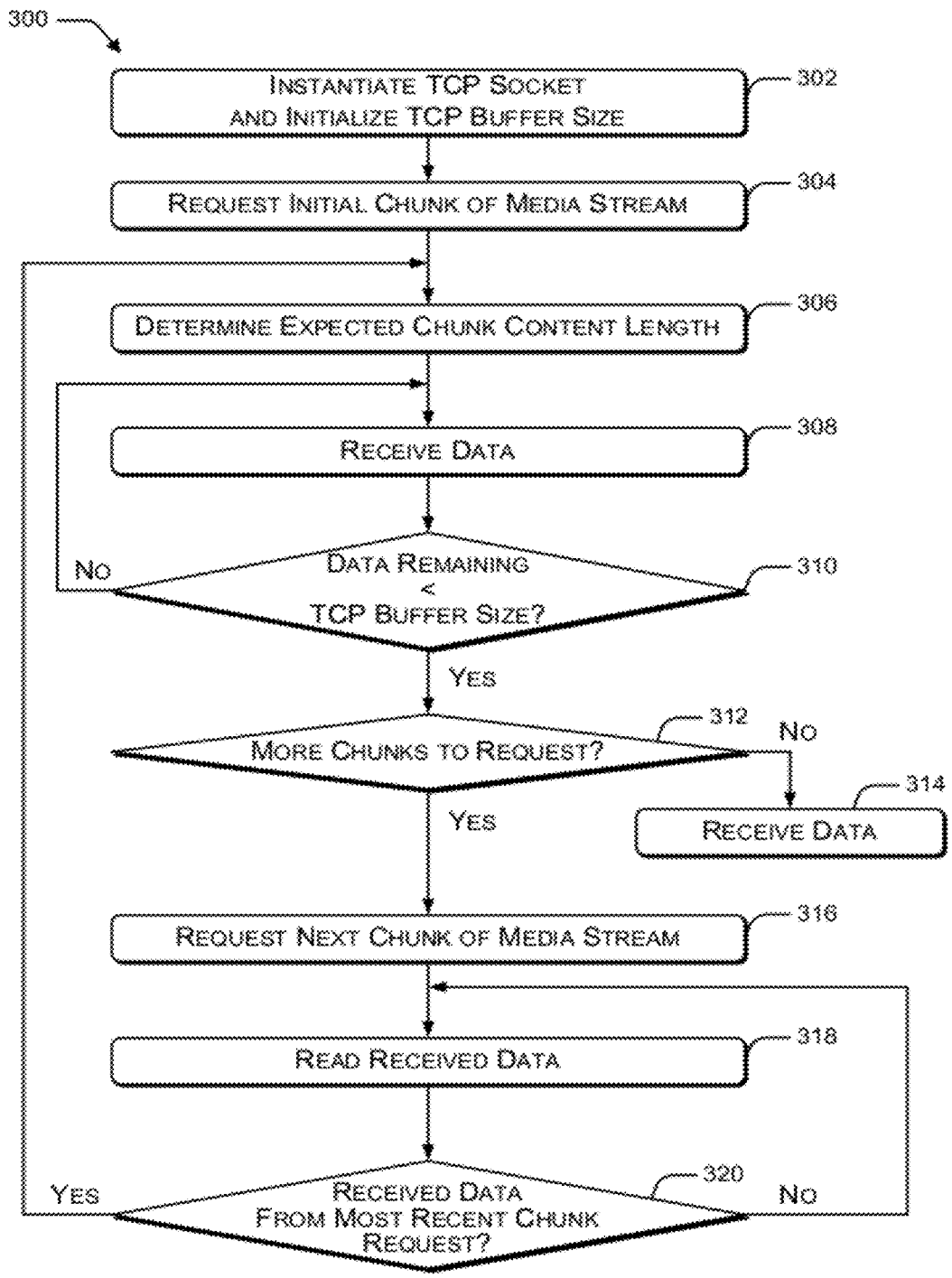
FIG. 3 is a flow diagram that illustrates an example process for issuing media requests to counter latency.
Figure 4:
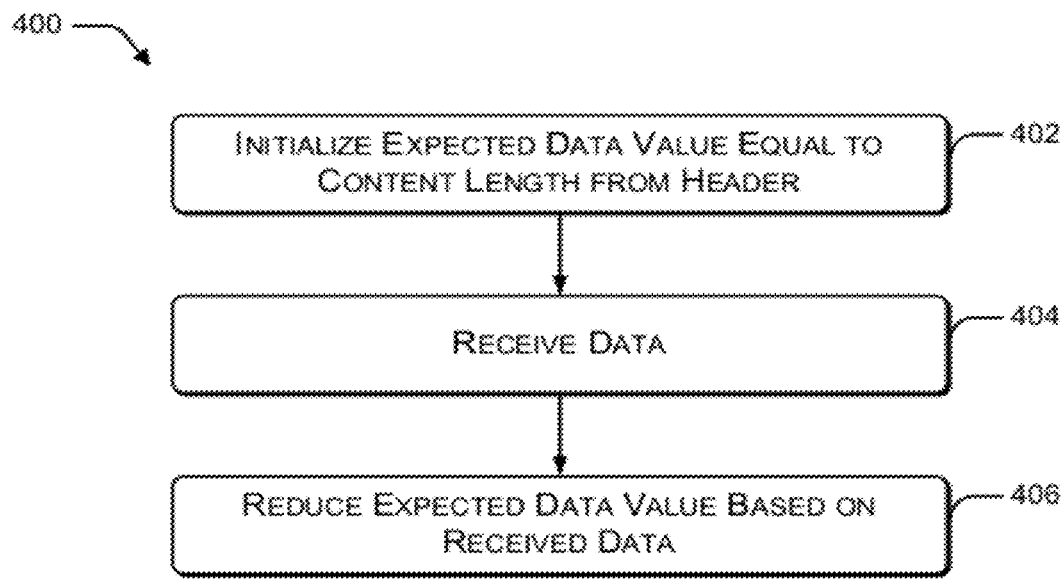
FIG. 4 is a flow diagram that illustrates an example process for monitoring an expected amount of data to be received.
Figure 5:
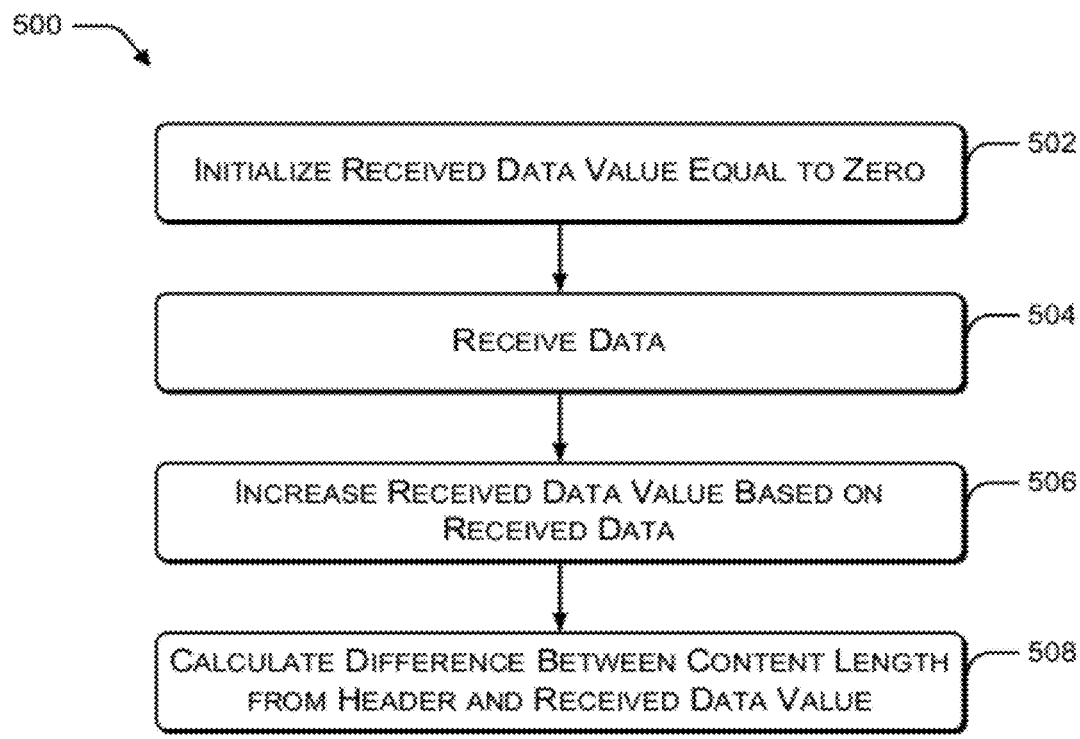
FIG. 5 is a flow diagram that illustrates an example process for tracking an amount of data that has been received.

FIGS. 3-5 illustrate example processes for making media stream chunk requests as described herein. These processes are illustrated as a collection of blocks in logical flow graphs, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while these processes are described with reference to the client device 108 described above with reference to FIG. 1, other computer architectures may implement one or more portions of this process, in whole or in part.

FIG. 3 illustrates an example process 300 for requesting and receiving media stream data. At block 302, the client media application instantiates a socket and initializes the receive buffer size. For example, client media application 126 instantiates socket 120, which may be a TCP socket. Client media application 126 also sets a buffer size for the receive buffer 122 associated with the socket. As described above, the client media application 126 may have limited socket and buffer access. For example, client media application 126 may only be allowed to instantiate a single TCP socket with a receive buffer size of 128 KB.

At block 304, the client media application requests an initial chunk of a media stream. For example, media request generator 130 generates an HTTP GET request, which is transmitted over the network 106 to server 102 to request a first chunk of media stream 104.

At block 306, the expected chunk content length is determined. For example, as the first chunk of media stream 104 is received by the client media application 126, a "Content Length" header entry is read to determine the expected size of the first chunk of media stream 104.

At block 308, data received in response to the request is read. For example, as the server sends the requested media stream chunk, the received data is stored in the receive buffer 122. From there, the networking stack processes the data, making it available to client media application 126. For example, decoder 132 reads the received data from the networking stack and sends the decoded data to the client buffer 134.

At block 310, a determination is made as to whether or not the size of the remaining data to be received is less than the size of the receive buffer. For example, data received monitor 136 tracks the amount of data that has been received by the client media application. In various implementations, for example, the data that is received may be monitored as it is read from the networking stack, or as it is added to the client buffer. In an example implementation, client media application 126 maintains a value to track data remaining to be received. This value is initialized to the full size of the requested chunk, based on the received header data. As data associated with the requested chunk is received, the maintained value is reduced based on the amount of data received. This value is then compared with the size of the receive buffer to determine an appropriate time at which to request the next chunk of the media stream.

In an alternate implementation, client media application 126 maintains a value to track the amount of data that has been received. This value is initialized to zero. As data associated with the requested chunk is received, the maintained value is incremented based on the amount of data received. A difference between the maintained value and the size of the requested chunk, based on the received header data, is compared with the size of the receive buffer to determine an appropriate time at which to request the next chunk of the media stream.

FIGS. 4 and 5 provide two example implementations for determining the amount of data remaining.

If the size of the remaining data to be received is not less than the size of the receive buffer (the "No" branch from block 310), then processing continues as described above with reference to block 308.

If, at block 310, it is determined that the size of the remaining data to be received is less than the size of the receive buffer (the "Yes" branch from block 310), then at block 312, a determination is made as to whether or not additional chunks of the media stream remain to be requested. For example, client media application 126 may examine previously received header information to determine how many chunks of data are associated with the requested media stream.

If there are no more chunks of the media stream to be requested (the "No" branch from block 312), then at block 314, the client media application continues reading the received data until all of the requested and received data has all been read.

On the other hand, if at block 312 it is determined that there are more chunks of the media stream to request (the "Yes" branch from block 312), then at block 316, the next chunk of the media stream is requested. For example, media request generator 130 creates and sends a subsequent HTTP GET request for a next chunk of the media stream.

At block 318, data received in response to one of the previous requests is read. For example, client media application 126 continues to read data from the networking stack 124.

At block 320, a determination is made as to whether or not the data that was read according to block 318 was received in response to the most recent chunk request. For example, client media application 126 monitors the data read from the networking stack 124 for a header that signifies the beginning of new chunk of the media stream. If the data that was read according to block 318 was received in response to the previous request, not the most recent request, meaning that no new header has yet been received (the "No" branch from block 320) then processing continues as described above with reference to block 318.

If the data that was read according to block 318 was received in response to the most recent request, as may be indicated by the receipt of a new chunk header, (the "Yes" branch from block 320), then processing continues as described above with reference to block 306.

FIG. 4 illustrates an example process 400 for determining the amount of data remaining to be received in response to a previously submitted request for a chunk of a media stream. At block 402, the client media application initializes an expected data value equal to the content length from received header data. For example, client media application 126 extracts a content length value from a TCP header received in response to a request for media content, and initializes a value for tracking the remaining data to be received with this value.

At block 404, the client media application 126 receives media data in response to the previously submitted request for the chunk of the media stream.

At block 406, the client media application 126 reduces the expected data value by an amount equal to the size of the received data. In this way, the expected data value consistently represents the size of the data that is expected, but that has not yet been received in response to the previously submitted request.

FIG. 5 illustrates an example process 500 for determining the amount of data remaining to be received in response to a previously submitted request for a chunk of a media stream. At block 502, the client media application initializes a received data value equal to zero.

At block 504, the client media application receives requested data.

At block 506, the received data value is increased based on the received data.

At block 508, the client media application determines the remaining amount of expected data by calculating a difference between a content length extracted from a header of the received data and the received data value.

If a client media application implemented on a device with limited socket and buffer resources waits until the media application has received all of the data from a particular HTTP GET request before issuing a subsequent HTTP GET request, media presentation quality may be degraded due to network latency. Furthermore, a subsequent request may result in a burst of network traffic that may negatively affect network performance. Rather than the client media application waiting until all of the data from a previous HTTP GET request has been received before issuing another HTTP GET request, this technique takes advantage of the header data that specifies the length of the requested chunk, and the knowledge of the TCP receive buffer size. As soon as the client media application determines that the data remaining to be received in response to the most recent HTTP GET request is less than the TCP receive buffer size, the client media application issues another HTTP GET request for the next chunk. As a result, the TCP receive buffer is refilled with data from the second chunk more quickly, thereby reducing the likelihood of presentation quality degradation due to network latency, and minimizing network bursts due to delayed HTTP GET requests.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A method comprising:
   determining a buffer size associated with a buffer for receiving media data;
   requesting for a first chunk of a media stream;
   receiving through the buffer, the first chunk of the media stream in response to the request;
   determining an expected size of the first chunk of the media stream; and
   in response to determining that a size of data associated with the first chunk of the media stream that has not yet been received is smaller than the buffer size, requesting for a second chunk of the media stream, prior to receiving all of the data associated with the first chunk of the media stream.

2. A method as recited in claim 1, wherein determining the buffer size associated with the buffer for receiving media data comprises:
   instantiating a network communication socket for receiving the media stream, the socket having an associated buffer; and
   initializing the buffer to have the buffer size.

3. A method as recited in claim 2, the network communication socket comprises a Transport Control Protocol (TCP) socket.

4. A method as recited in claim 1, wherein the buffer size is 128 KB.

5. A method as recited in claim 1, wherein the request for the first chunk of the media stream comprises a Hypertext Transfer Protocol (HTTP) GET request.

6. A method as recited in claim 1, wherein determining the expected size of the first chunk of the media stream comprises accessing a data header entry that specifies the size of the first chunk.

7. A method as recited in claim 1, wherein the media stream comprises audio data.

8. A method as recited in claim 1, wherein the media stream comprises video data.

9. One or more computer readable storage media encoded with computer-executable instructions that, when executed, configure a computer system to perform a method as recited in claim 1.

10. A media player application at least partially stored in one or more computer readable storage media and executed on a processor to perform a method as recited in claim 1.

11. A method comprising:
    instantiating a Transport Control Protocol (TCP) socket having a TCP buffer with a known buffer size;
    issuing a Hypertext Transfer Protocol (HTTP) GET request for a first chunk of a media stream;
    receiving header data for the first chunk of the media stream that indicates a data length of the first chunk of the media stream;
    initializing a value to track remaining data of the first chunk to be received equal to the data length of the first chunk of the media stream;
    reading data into a client application from the TCP buffer;
    reducing the value to track remaining data of the first chunk to be received based on the data that read into the client application; and
    when the value to track remaining data of the first chunk to be received is less than the buffer size, issuing another HTTP GET request for a second chunk of the media stream.

12. A method as recited in claim 11, wherein the buffer size is smaller than a size of the media stream.

13. A method as recited in claim 11, wherein reading data into a client application from the TCP buffer comprises:
    processing data from the TCP buffer by a networking stack;
    the client application reading the data from the networking stack.

14. One or more computer readable storage media encoded with computer-executable instructions that, when executed, configure a computer system to perform a method as recited in claim 11.

15. A media player application at least partially stored in one or more computer-readable storage media and executed on a processor to perform a method as recited in claim 11.

16. A system comprising:
    a processor;
    a memory communicatively coupled to the processor; and
    a media application at least partially stored in the memory and executable on the processor, the media application including:
      a media request generator for creating and sending requests for streaming media content;
      a data received monitor for:
        monitoring an amount of data received, compared to an expected amount of data; and
        indicating when a remaining amount of expected data is less than a size of a buffer for receiving the media content; and
      a media request generator for:
        creating and sending a request for a subsequent chunk of streaming media content when the data received monitor indicates that the remaining amount of expected data is less than the size of the buffer for receiving the media content.

17. A system as recited in claim 16, wherein the request for the subsequent chunk of streaming media content comprises Hypertext Transfer Protocol (HTTP) GET requests.

18. A system as recited in claim 16, wherein the buffer for receiving the media content is a Transport Control Protocol (TCP) receive buffer.

19. A system as recited in claim 16, wherein the expected amount of data is determined based on header data associated with a received chunk of media content.

\* \* \* \* \*